UNITED STATES PATENT OFFICE.

EMIL BEHRING, OF HALLE-ON-THE-SAALE, GERMANY, ASSIGNOR TO THE FARBWERKE, VORMALS MEISTER, LUCIUS & BRÜNING, OF HÖCHST-ON-THE-MAIN, GERMANY.

DIPHTHERIA ANTITOXIN AND PROCESS OF MAKING SAME.

SPECIFICATION forming part of Letters Patent No. 606,042, dated June 21, 1898.

Application filed January 11, 1895. Serial No. 534,577. (No specimens.)

*To all whom it may concern:*

Be it known that I, EMIL BEHRING, a citizen of the Empire of Germany, and a resident of Halle-on-the-Saale, in the Empire of Germany, have invented certain new and useful Improvements in the Manufacture of Diphtheria Antitoxin, of which the following is a specification.

My invention consists in the production of a substance called "diphtheria antitoxin," by means of which people may be immunized against diphtheria and people suffering from diphtheria may be cured.

In order to obtain this antitoxin, I proceed in the following manner: Animals which can be infected with diphtheria, horses being the most suitable, are poisoned with a small or weakened dose of diphtheria poison or living diphtheria bacilli. After they have recovered from the attack of diphtheria thus produced they are again made ill with a larger or stronger dose of diphtheria poison or diphtheria bacilli, and this treatment is repeated until they are able to bear a large dose of diphtheria poison or diphtheria bacilli without being killed.

I have found that the fluids of the tissues, and especially the blood of animals which have been treated sufficiently long in the above manner and have recovered, contain a substance—the so-called "diphtheria antitoxin"—which on being applied in a suitable manner—for instance, by subcutaneous injection of a solution of the antitoxin—is fitted for curing people infected with the diphtheria bacillus and for protecting people against infection for a certain time by making them immune. The serum of animals thus immunized with bacteria poison possesses not only the well-known property of killing the bacteria themselves, but contains also a counter poison that has the property of destroying the poison secreted by the bacteria.

I ascertain whether the treatment of the animals has been continued sufficiently long by mixing a certain quantity of diphtheria poison of known strength with a certain quantity of blood-serum containing antitoxin and by injecting this mixture into a test animal. According to whether the animal remains healthy or becomes infected with diphtheria the quantity of antitoxin in the blood-serum may be determined.

The serum in question is prepared for use, after it has been obtained from the animals by bleeding or in other suitable manner, by freeing it from all foreign substances as far as possible. Thus after separating the blood-corpuscles from the blood the serum alone is employed.

In order to obtain the antitoxin in concentrated form as well as in dilute solution, it may be precipitated from the solution by known methods—*e.g.*, by means of ammonium sulfate, aluminium hydroxid, &c.—the resulting precipitates extracted with alkaline solutions, and the extract evaporated to dryness *in vacuo* at a low temperature, or the original solution may be evaporated to dryness.

To prevent a decomposition of the antitoxin or of its solution, a preservative substance, especially a small quantity of carbolic acid or a similar substance, is added.

What I claim as my invention is—

1. The process herein described of producing diphtheria antitoxin, which consists in inoculating horses or other animals capable of being infected with diphtheria with repeated doses of diphtheria poison or living diphtheria bacilli of gradually-increasing quantity and strength, so as to immunize them and form in the blood a counter poison for destroying the poison secreted by said bacilli, drawing off the blood from said animals, separating the serum from the blood-corpuscles, and concentrating the former for use, substantially as set forth.

2. As a new substance, diphtheria antitoxin, consisting of the concentrated serum of the blood of animals treated with diphtheria poison and having the characteristic of immunizing test animals against infection with diphtheria, and curing them when artificially infected with diphtheria, said serum containing a counter poison having the property of destroying the poison secreted by the diphtheria bacilli, substantially as set forth.

In testimony that I claim the foregoing as my invention I have signed my name in presence of two subscribing witnesses.

EMIL BEHRING.

Witnesses:
AUGUST DU RIDDER,
AUGUST LAUBENHEIMER.